(12) United States Patent
Peacock et al.

(10) Patent No.: US 6,601,111 B1
(45) Date of Patent: *Jul. 29, 2003

(54) METHOD AND APPARATUS FOR UNIFIED EXTERNAL AND INTERPROCESS COMMUNICATION

(75) Inventors: Gavin Peacock, Pleasant Hill, CA (US); Jeffrey C. Hawkins, Redwood City, CA (US)

(73) Assignee: PalmSource, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/113,452

(22) Filed: Jul. 10, 1998

Related U.S. Application Data

(63) Continuation-in-part of application No. 08/790,518, filed on Jan. 29, 1997.

(51) Int. Cl.⁷ .............................. G06F 9/00; G06F 9/46
(52) U.S. Cl. ....................................................... 709/310
(58) Field of Search ................................ 709/328, 313, 709/206, 207, 331, 310, 219, 246

(56) References Cited

U.S. PATENT DOCUMENTS

| | | | | |
|---|---|---|---|---|
| 5,396,630 A | * | 3/1995 | Banda et al. ............... | 395/700 |
| 5,557,798 A | * | 9/1996 | Skeen et al. ................ | 395/650 |
| 5,602,997 A | * | 2/1997 | Carpenter et al. .......... | 395/349 |
| 5,864,862 A | * | 1/1999 | Kriens et al. ............... | 707/103 |
| 5,900,875 A | * | 5/1999 | Haitani et al. .............. | 345/349 |

OTHER PUBLICATIONS

M. Kramer, et al, "Use of Two-Way Wireless Messaging for Personal Telephone Management", IEEE, 1993. pp. 743-748.*

* cited by examiner

*Primary Examiner*—Sue Lao
(74) *Attorney, Agent, or Firm*—Van Mahamedi; Hickman Palermo Truong & Becker LLP

(57) ABSTRACT

Data communications are provided in a computer system by accepting message information within a unified information exchange manager. The unified exchange manager is executed to select an appropriate application from a plurality of applications that are executable on the computer system. The unified exchange manager selects the appropriate application based on a data type of the message information. The message information from the unified information exchange manager is passed to the appropriate application program if said user accepts said message information.

14 Claims, 8 Drawing Sheets

METHOD AND APPARATUS FOR UNIFIED EXTERNAL AND INTERPROCESS COMMUNICATION

PRIOR APPLICATION

This application is a continuation-in-part of application Ser. No. 08/790,518 filed on Jan. 29, 1997.

FIELD OF THE INVENTION

The present invention relates to the field of computer operating systems software. In particular the present invention discloses a method of providing an immediate response computer communication system for both external and internal interprocess communication.

BACKGROUND OF THE INVENTION

Modern computer operating systems support several application programs executing concurrently. To communicate with external hardware devices, the application programs call input/output routines in the operating system. To facilitate communication between applications, an operating system may provide a message passing system or a method of opening "sockets" between applications.

However, using two different methods for communicating information is unnecessarily complex. It would be desirable to have a simplified method of communicating information from and to application programs. Furthermore, it would be desirable to have a messaging system that allows dormant applications to be immediately activated upon receiving information that is destined for the dormant application.

BRIEF DESCRIPTION OF THE DRAWINGS

The objects, features and advantages of the present invention will be apparent to one skilled in the art, in view of the following detailed description in which.

DETAILED DESCRIPTION OF THE PREFERRED EMBODIMENT

A method and apparatus for providing an immediate response computer communication system that provides both external and interprocess communication is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to an exchange manager in a mobile computer system. However, the same techniques can easily be applied to other types of computer devices.

Operating System Architecture

Figure 1:
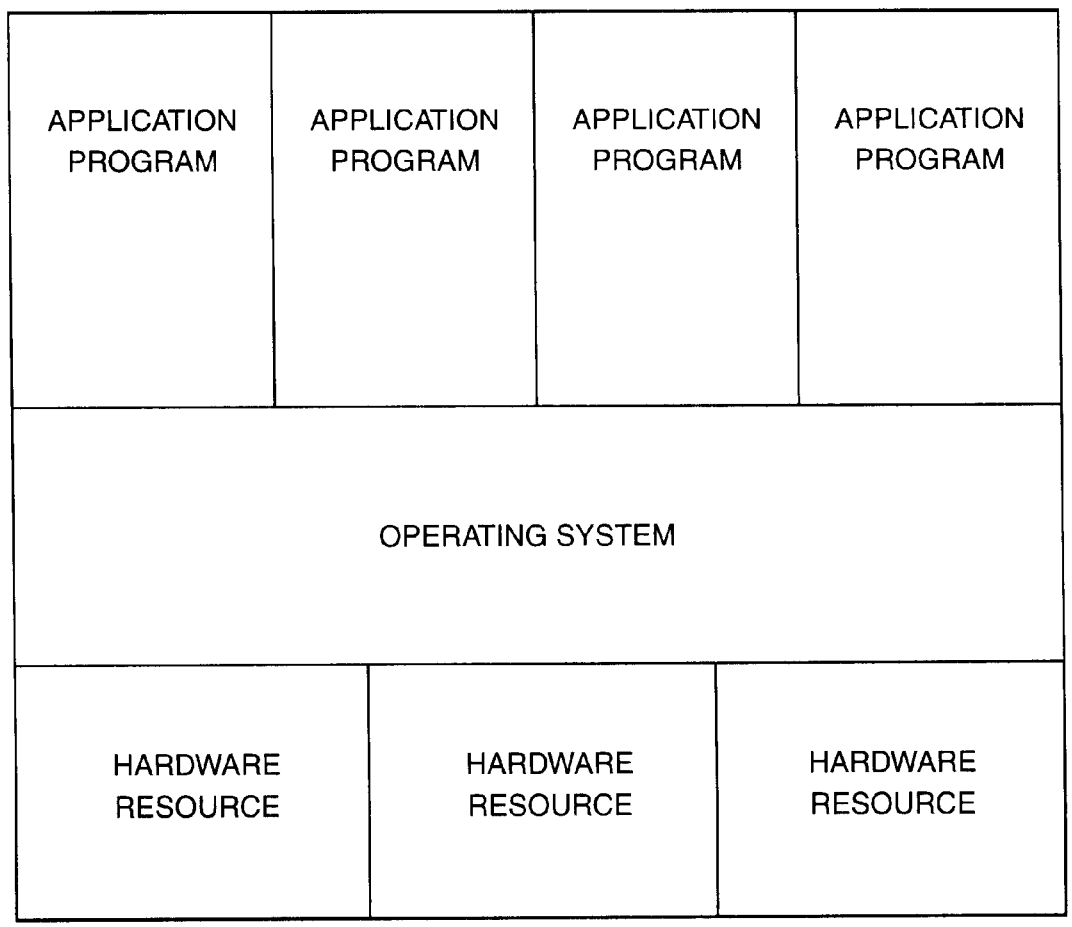
FIG. 1 illustrates a conceptual diagram of a typical computer operating system.

An operating system is a computer program that provides a consistent high level interface between computer application programs and computer hardware. FIG. 1 illustrates a conceptual diagram of a computer system. Referring to FIG. 1, the operating system is positioned between application programs and the computer hardware. Thus, the operating system controls all the computer hardware directly.

To access computer hardware features, application programs must communicate with the operating system by making system calls. For example, if an application program wishes to communicate externally using a serial port, the application program must make a system call into the operating system requesting the serial port communication. The operating system directly communicates with the serial port and performs the serial port communication desired by the application program.

In modern operating systems, the operating system shares the computer hardware resources among several concurrently executing application programs. Thus, the operating system arbitrates requests for the same hardware feature from more than one application program.

Besides handling communication with computer hardware, modem operating systems must provide a method of allowing different application programs to communication with each other. Such a feature is referred to as "interprocess" communication.

An "In-Box" Approach

One method of providing an interprocess and external communication system would be to provide an operating system messaging subsystem, an "In-Box", that handles messaging. The In-Box would accept interprocess and external messages for applications that are not currently executing and store such messages for later delivery. Active applications that accept interprocess and external messages would be notified when they have received a message. Alternatively, active applications could periodically poll the In-Box determine if a message has been received. When a message is received for an application, that application would then be responsible for collecting the message from the In-Box.

Such an In-Box system requires the applications to proactively collect messages from the In-Box. Thus, the user would not have any immediate feedback when messages are received. The user would need to activate the application such that the application would fetch received messages from the In-Box program. A more immediate message delivery system would be desirable.

Unified Exchange Manager Architecture

The present invention introduces an improved operating system construct that allows application programs to immediately communicate with external communication hardware and communication with other application programs using a single consistent interface. The operating system subsystem that provides this functionality is known as the "Exchange Manager." The Exchange Manager provides immediate user feedback by immediately activating applications that have received messages. Furthermore, the Exchange Manager is extensible such that it allows new communication libraries to be added thereby allowing the Exchange Manager to adopt new communication technologies that emerge.

Figure 2:
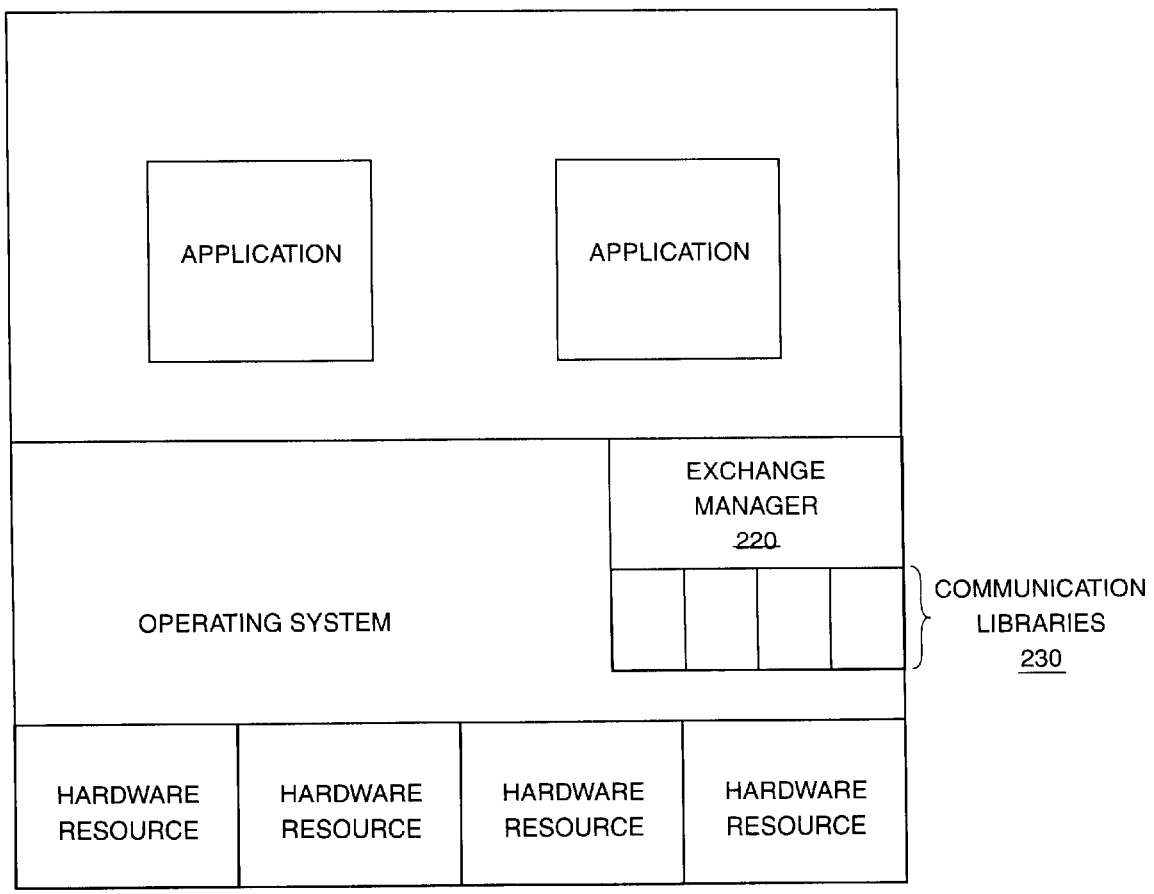
FIG. 2 illustrates a conceptual diagram of an operating system built according to the teachings of the present invention.

FIG. 2 illustrates a conceptual diagram of computer system that includes an Exchange Manager 220 subsystem in the operating system. Referring to FIG. 2, all communication between the application programs and external communication hardware is performed through the Exchange Manager 220.

To handle communication details for different protocols and different media, the Exchange Manager 220 transacts with a set of communication libraries 230. The communication libraries 230 implement protocol stacks and handle the communication with the device drivers associated with individual communication devices.

A serial TCP/IP communication library is one example of a communication library. The serial TCP/IP communication library may implement the Transport Communication Protocol/Internet Protocol (TCP/IP) stack and the Point-to-Point Protocol (PPP) stack for Internet communication. The serial TCP/IP communication library would communicate with a serial port driver to send and receive data from the computer system.

Figure 3:
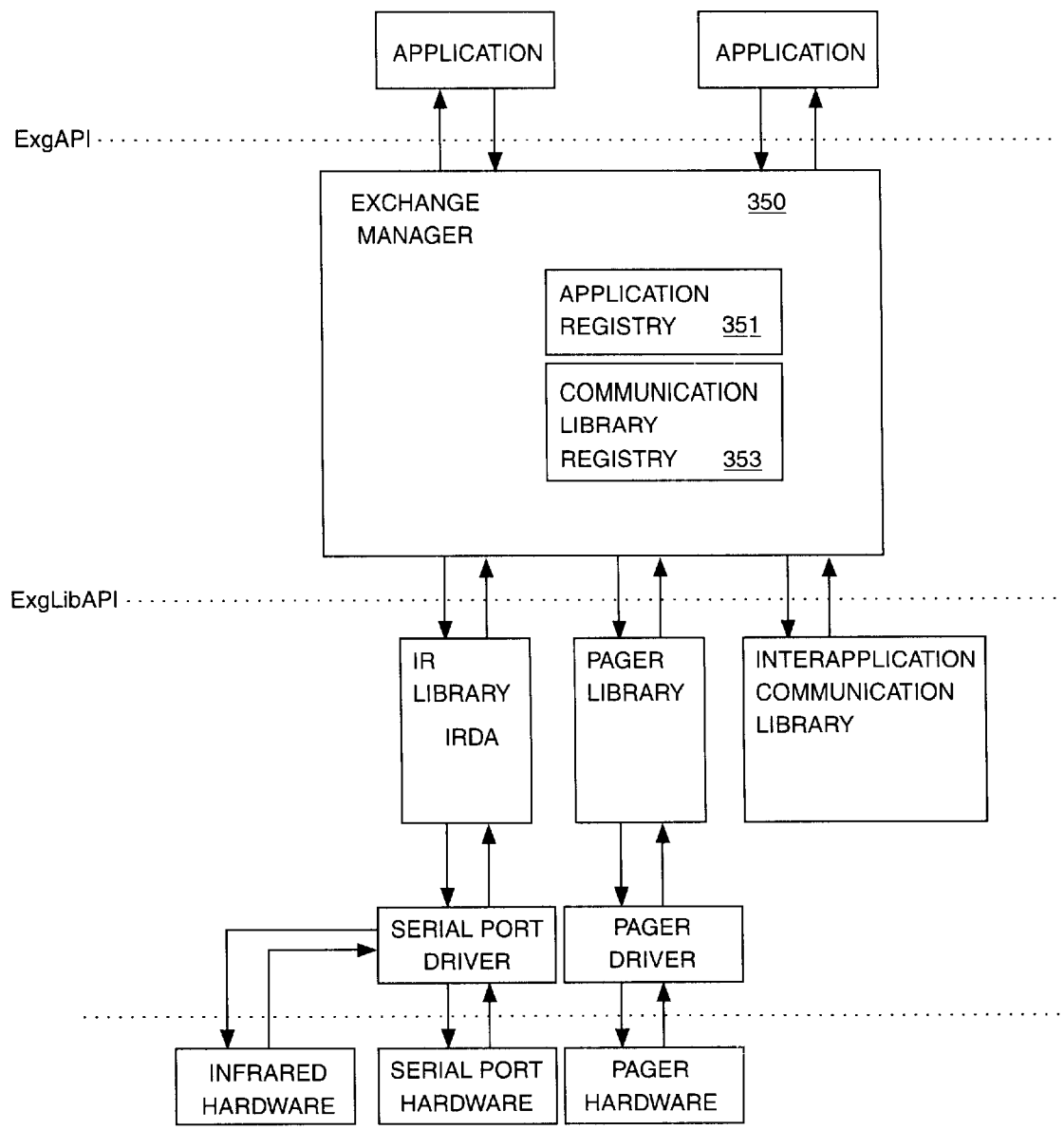
FIG. 3 illustrates a conceptual diagram of the Exchange Manager Architecture.

FIG. 3 illustrates a more detailed conceptual diagram of the Exchange Manager Architecture. As illustrated in FIG. 3, another example of a communication library is an Infrared Communication library. The Infrared Communication library may use a serial device driver to communicate with an infrared device. An example of the serial port driver that may be used is described in the co-pending U.S. patent application entitled "Method and Apparatus for Serial Port Sharing" with Ser. No. 09/078,357 filed on May 13, 1998.

It is important to note that the Exchange Manager is always available for operation. In one embodiment, the Exchange Manager resides in memory that is always available to the processor. Thus, the features of the Exchange Manager are available any time that the computer system receives a message from an external source.

Referring to FIG. 3, the application programs communicate with the Exchange Manager 350 through an exchange application programming interface (ExgAPI). Each application program that is capable of accepting messages registers with the exchange manager. When an application registers with the Exchange Manager, the Exchange Manager stores information about the application in an application registry 351.

Exchange Manager Application Registry

The application registration procedure provides the information that allows the Exchange Manager to receive information for the application and notify the application when information has been received. To identify incoming data, the Exchange manager needs to know about the types of data that a program will accept. In one embodiment, this is performed by having the application programs provide the following pieces of information to the Exchange Manager: a creator identification (creatorID), a MIME data type, and an file extension. The application registration procedure is also used to provide the Exchange Manager with a set program entry points that will be used by the Exchange manager when the Exchange manager receives a message for that application program.

In the embodiment that uses the creatorID parameter, the creatorID is used to uniquely identify a particular application program. In one embodiment, the creatorID is value that is registered with the operating system manufacturer and is defined to uniquely identify one particular program.

The MIME type identifies a particular Multipurpose Internet Mail Extension (MIME) type of data that the program is designed to handle. Detailed information about the MIME types can be found at the Internet Mail Consortium's web site at http://www.imc.org/ In the present invention, application programs identify the MIME types that they can handle. If more than one application supports a particular MIME type, then the user may select a default application that will be used to accept messages of that MIME type.

The file extension describes a three letter filename extension that defines a type of information that the application handles. The three letter extension is a legacy of the Microsoft DOS and Windows 3.1 operating systems. For example, the three letter extension "JPG" refers to JPEG image files and the three letter "DOC" extension refers to Microsoft Word files.

Each application that can receive messages also provides a few entry point vectors to the Exchange Manager. A first entry point vector provides a routine that should be called when the Exchange Manager begins receiving a message for a particular application. A second entry point vector provides a routine that should be called after receiving a full message for a particular application program. The operation of these entry point vectors will be describe in more greater detail in a later section.

Communication Libraries

Referring back to FIG. 3, the Exchange Manager 350 communicates with various communication libraries through an Exchange Library Application programming interface (ExgLibAPI). The communication libraries are software modules designed to handle different types of communication systems. New communication libraries may be added to handle new communication protocols and new communication media. When a new communication library is added, the Exchange Manager 350 stores information about the new communication library in a communication library registry 353.

In the example of FIG. 3, there are three communication libraries: an Infrared (IR) communication library, a Pager communication library, and an Interapplication communication library. Each communication library handles a different medium.

The IR communication library allows the portable computer to communicate with the outside world using an infrared port.

The Pager Library allows the portable computer system to receive information from the outside world using pager communication hardware. Thus, a mobile computer system could receive alphanumeric messages from a paging network.

The Interapplication communication library allows various applications on the portable computer system to communicate with each other. Specifically, applications send messages to the interapplication communication library to pass interprocess messages. The Interapplication communication library routes all information it receives back up through the exchange manager to the recipient application. Thus, the interapplication communication library does not communicate with any external hardware. It should be noted that by implementing interprocess communication using an Interapplication communication library, both external and interapplication communication are performed using a single information exchange interface, the exchange application programming interface (ExgAPI).

To fully explain the workings of a typical communication library, the Infrared communication library will be examined in greater detail. The IR communication library allows the portable computer to communicate with the outside world using an infrared data port. In one embodiment, a special serial driver is used to control access to the infrared data port. Information about the serial driver can be found in the co-pending U.S. patent application entitled "Method and Apparatus for Serial Port Sharing" with Ser. No. 09/078,357 filed on May 13, 1998 which is hereby incorporated by reference. The IR communication library implements portions of the IrDA infrared standards to communicate using infrared light. The IrDA infrared standards define standards for infrared hardware, infrared software, and infrared communication protocol. Detailed information about the IrDA standards can be found at the Infrared Data Association's web site located at http://www.irda.org/.

In one embodiment, the IR communication library implements the IrDA protocol suite including the Specifications for Infrared Mobile Communications (IrMC) and the IrDA Object Exchange Protocol (IrOBEX). The IrDA Object Exchange Protocol (IrOBEX) allows the mobile computer system to "squirt" (send) and "slurp" (receive) various types of know data objects such as virtual business cards (vCards) and calendar entries. However, other types of object exchange systems may be used.

Unified Exchange Manager

The Exchange Manager provides a simple standardized interface to applications what wish to receive messages from external sources or other applications. To best disclose how the Exchange Manager interacts with applications, control flow examples are provided.

Exchange Manager Example Using Default Pop-Up Verification

Figure 4:
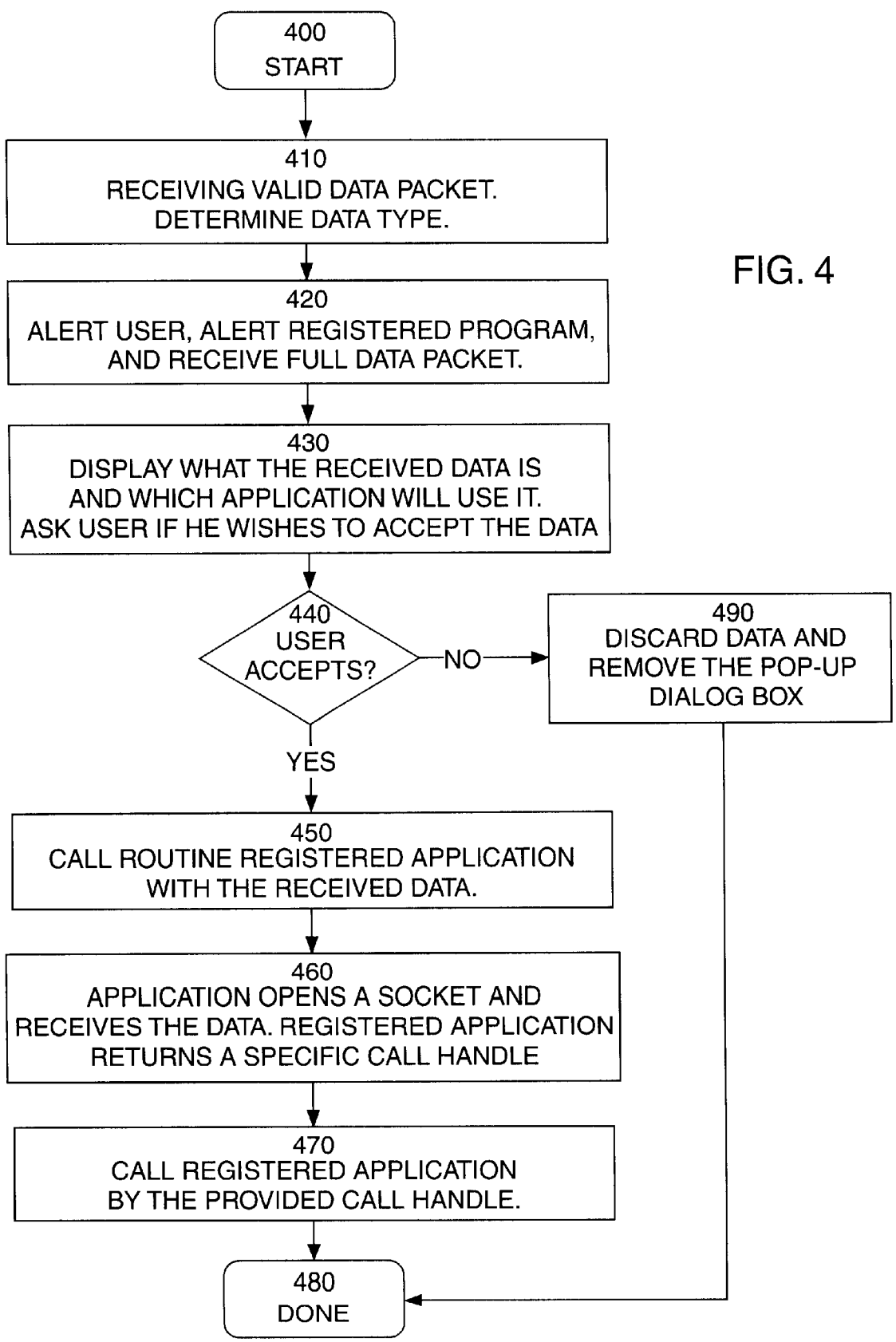
FIG. 4 illustrates a flow diagram that describes how the Exchange Manager operates when the default accept/reject dialogue is used.

FIG. 4 illustrates a flow diagram that describes one example of how the Exchange manager may operate when it receives an incoming message. The example of FIG. 4 discloses an example where a default accept/reject dialog box is present to the user. However, it should be noted that other methods of interacting with the Exchange manager may be occur.

Referring to step 410, the Exchange manager begins receiving data from one of the communication libraries. The Exchange manager examines the data packet headers in order to determine a what kind of data is being received. The data may be described with a MIME type, a creatorID, or a filename suffix. The Exchange Manager extracts a MIME type, a creatorID, or a filename suffix from the incoming data to determine a data type.

Next, at step 420, the Exchange Manager alerts the user that data is being received. This can be accomplished by presenting a pop-up dialog box. The Exchange manager then examines the Application Registry 351 to locate an application program that handles the incoming data type. If no matching application is found, then the Exchange Manager may simply discard the data. Alternatively, the Exchange Manger may ask the user if he wishes to save the data for later use.

When a matching application is found, the Exchange Manager makes a call into a callback routine that the application provided when it registered with the Exchange Manager. The callback routine is used to alert the application about the incoming data for that application. If more than one application has registered to receive the particular data type, then a default application will be used.

The application may respond in the callback routine in number of ways. The application may simply reject the data such that the Exchange Manager discards the incoming data. The application may simply accept the data. However, in one embodiment of the present invention, a default response is to allow the Exchange Manager to ask the user if he wishes to accept the information. This example will assume that the application elects to have the pop-up accept/reject dialogue box presented to the user. The Exchange Manager continues receiving data until the entire data packet is received.

At step 430, the Exchange Manager displays a dialogue box that describes the incoming data and specifies which application will be using the incoming data. If there is more than one application that has registered to receive that type of data, a list of applications may be displayed wherein the user may select which application will receive the data or whether the user will reject the data. The user is asked whether he wishes to accept the received data or reject the data. The user inputs a decision at step 440. If the user rejects the data, then the data is discarded and the pop-up dialogue box is dismissed as stated in step 490.

If the user elects to accept the data at step 440, then the Exchange Manager clears the pop-up dialogue box and calls a second callback routine into the application designated to receive the data at step 450. The second callback routine is a routine that fully handles incoming data. When the second callback routine is called, the Exchange Manager provides the received data packet or a pointer to the received data packet such that the application can process the received data packet.

At step 460, the callback routine processes the received data packet. In one embodiment, the application's callback routine opens up a socket to the Exchange Manager and accepts the data from the Exchange Manager. In another embodiment, the application's callback routine copies the data that is pointed to by a data pointer. When the application's callback routine is done processing the data, the application's callback routine returns a call handle vector that may be used to open the application and access the newly received data.

At step 470, the Exchange Manager calls the call handle provided by the application's callback routine. The call handle provided by the callback routine activates the application and, ideally, brings the application into a state where the newly received data is received. Thus, when a user receives information and accepts the information, the application that received the new information immediately displays the information to the user.

Exchange Manager Example Using Customized Acceptance or Denial

Figure 5:
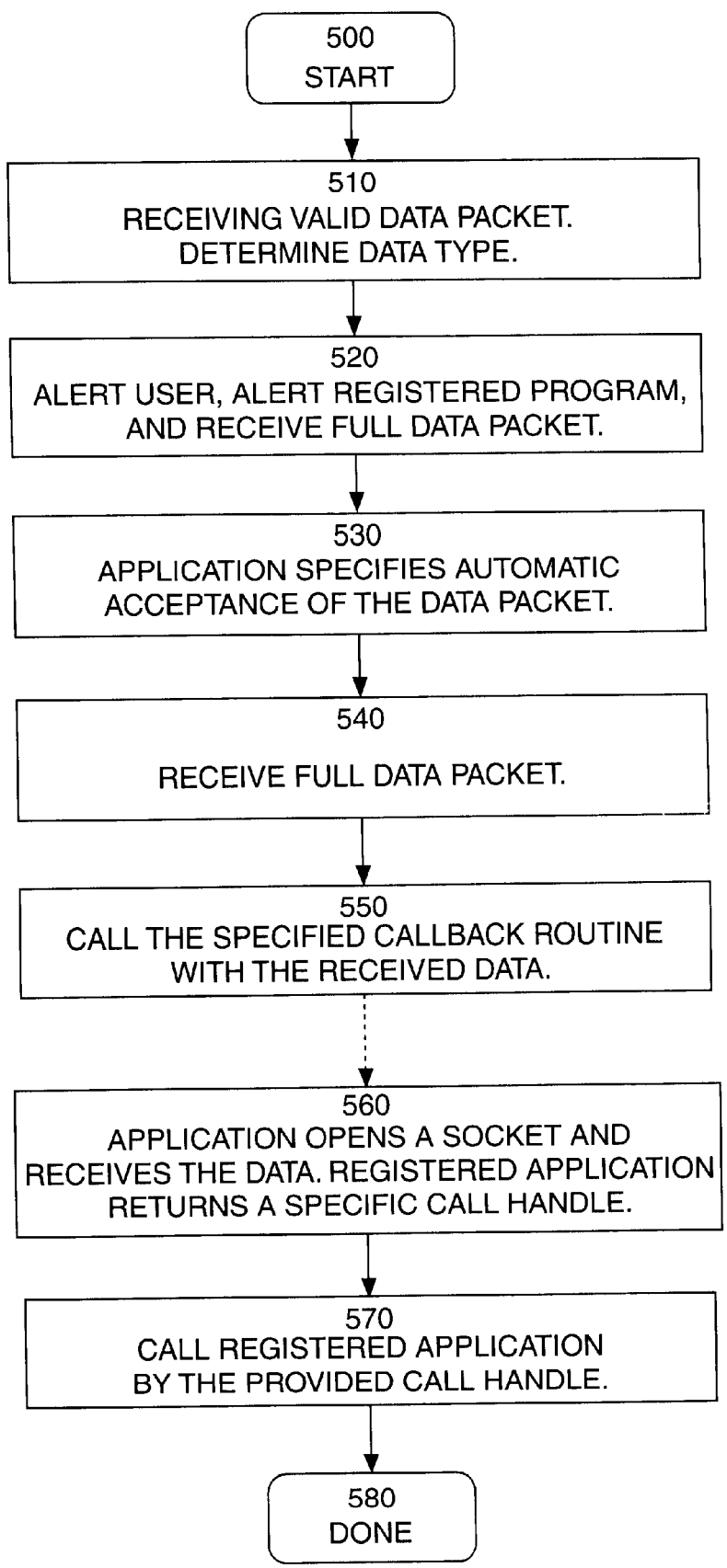
FIG. 5 illustrates a flow diagram that describes how the Exchange Manager operates when the default accept/reject dialogue is not used.

As previously set forth, an application that accept data packets from the Exchange manager do not have to use the default accept/reject mechanism. FIG. 5 provides a flow diagram that describes the operation of an application that does not use the default accept/reject dialogue.

Referring to step 510, the Exchange manager begins receiving data from one of the communication libraries and examines the data packet headers in order to determine a what kind of data is being received. Next, at step 520, the Exchange Manager makes a call into the data alert callback routine that the application provided when it registered with the Exchange Manager. In this example, the callback routine informs the Exchange Manager that the application program will accept the incoming data packet at step 530. However, the application could have rejected the data packet.

The Exchange Manager receives the full data packet at step 540. Next, the Exchange Manager calls a second callback routine into the application designated to receive the data at step 550. Within the callback routine at step 660, the callback routine accepts and processes the received data packet. The callback routine returns a call handle that will be used to activate the application program. At step 570, the Exchange Manager calls the call handle provided by the application's second callback routine. The call handle provided by the callback routine activates the application and brings the application into a state where the newly received data is received. Thus, an application can receive information and immediately display the newly received information without any input from the user.

Infrared Business Card Exchange Example

To best illustrate the features of the present invention, a practical example of use in a mobile computing system is provided. The practical example involves the exchange of an electronic business card from a first mobile computing device to a second mobile computing device.

Figure 6:
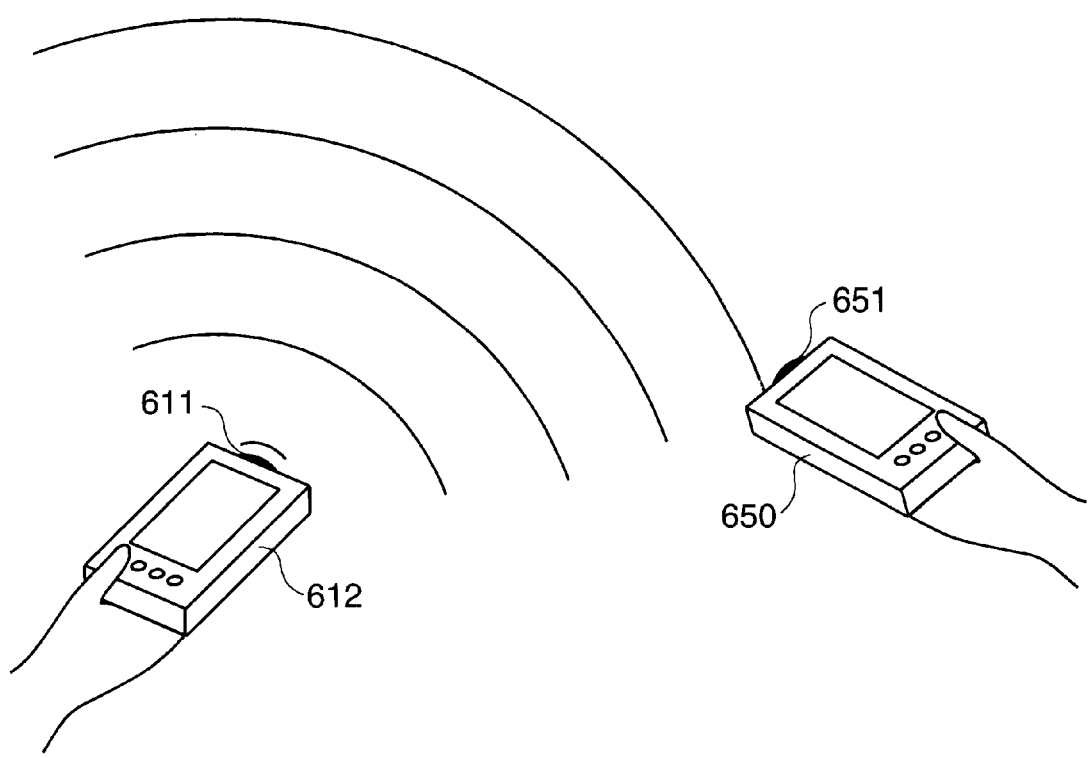
FIG. 6 illustrates two mobile computing devices that wish to transfer electronic business cards using an infrared link.

FIG. 6 illustrates two mobile computing devices 610 and 650. Each mobile computing device has a corresponding infrared transceiver 611 and 651 that can transmit and receive infrared data signals. To simplify the sharing of personal information, the present invention provides the architectural framework whereby one of the mobile computing devices can immediately transmit an electronic business card to the other mobile computing device. The present invention also provides the architectural framework whereby the receiving mobile computing device may immediately accept and use the received electronic business card.

Figure 7:
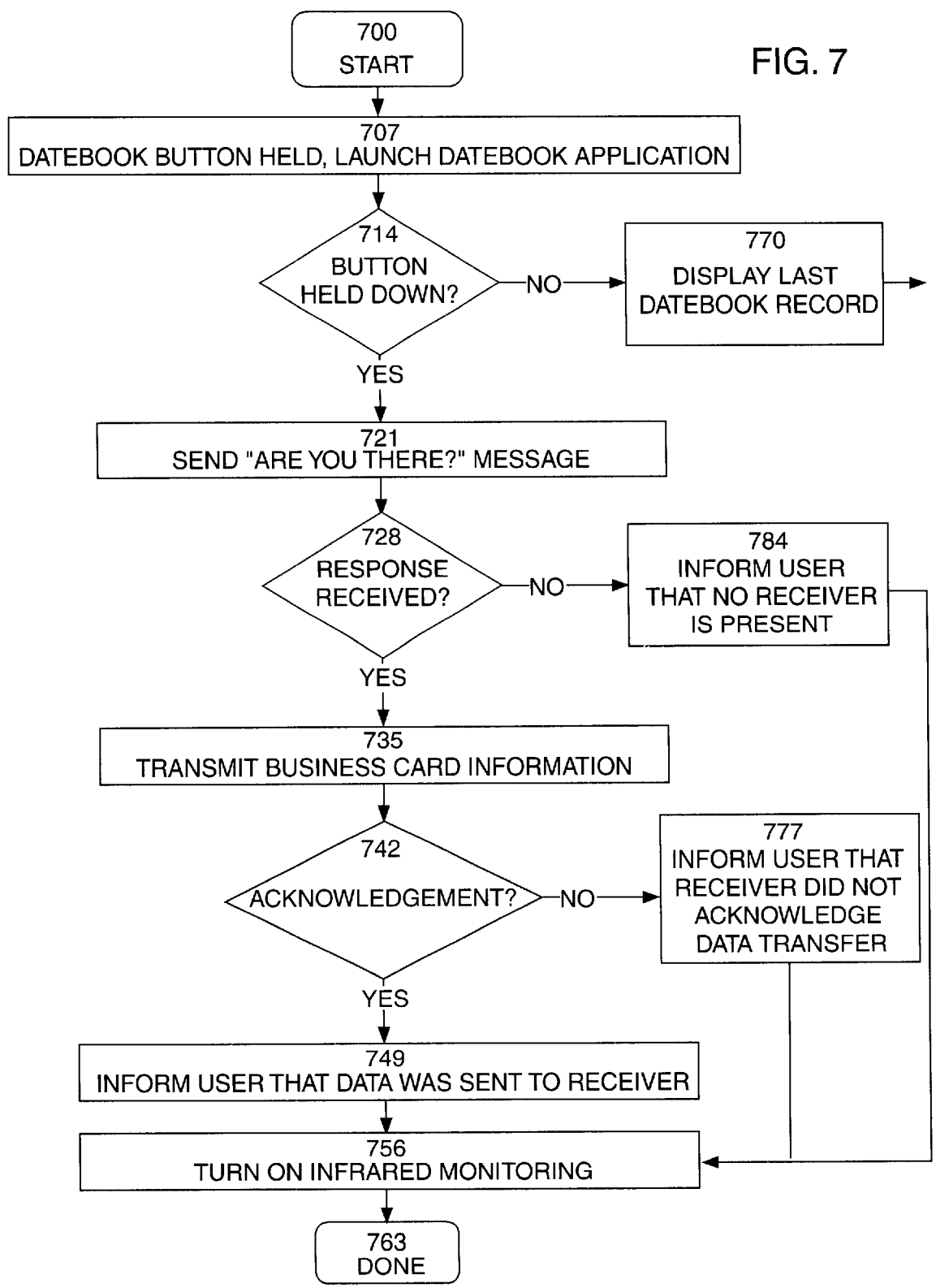
FIG. 7 illustrates a flow diagram that describes how a mobile computing device may transmit an electronic business card.
Figure 8:
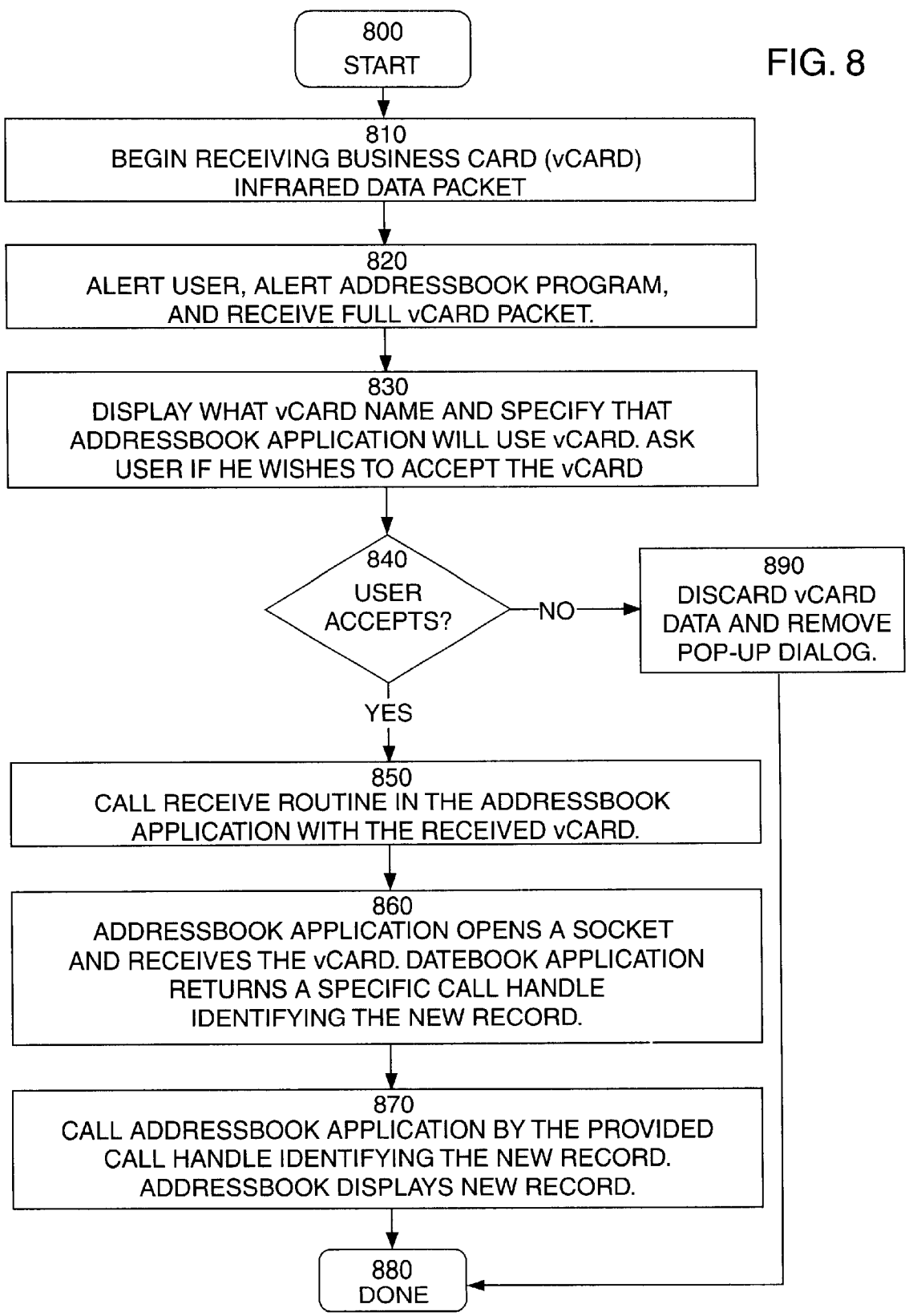
FIG. 8 illustrates a flow diagram that describes how a mobile computing device may receive an electronic business card using the Exchange Manager of the present invention.

To fully describe the business card exchange example, two flow diagrams are presented. FIG. 7 presents a first flow diagram wherein the control flow of a mobile computing device that transmits a business card is presented. FIG. 8 describes the control flow of a mobile computing device that receives an electronic business card.

An Infrared Business Card Sender

FIG. 7 discloses the control flow one possible embodiment of an electronic business card transmitter. The embodiment of FIG. 7 is described with reference to a mobile computing device disclosed in the U.S. patent application entitled "Method and Apparatus For Interacting With A Portable Computer System" filed Jan. 29, 1997 having Ser. No. 08/790,518 which is hereby incorporated by reference. In a mobile device constructed according to the teachings of the that application, a single button press can turn on the mobile computing device and launch a particular application. In the present invention, such a system is used wherein an addressbook button is pressed to launch an addressbook application at step 707 as illustrated in FIG. 6.

At step 714, the addressbook application determines if the addressbook button has been held for a predetermined amount of time such as two seconds. If the button has been released, then the addressbook application proceeds to step 770 where it displays an addressbook record. The addressbook application will continue executing according to the specific implementation of the addressbook program. However, if the addressbook button is held for the predetermined amount of time, then a business card sending routine is activated at step 721.

The business card sending routine is designed to send an electronic business card via an infrared link to a corresponding receiver application. To promote interactivity, the business card sending routine uses established standards such as the IrDA Infrared communication standards and the vCard (Virtual Business Card) standard from the Internet Mail Consortium. Detailed information about the IrDA infrared standards can be found at the Infrared Data Association web site at http://www.irda.org/. Similarly, detailed information about the vCard data format can be found at the Internet Mail Consortium web site http://www.imc.org/.

The business card sending routine first transmits an "Are you there?" packet that tests to see if there is a nearby receiver to receive an electronic business card. At step 728, the mobile device will monitor for a response.

If there is no nearby infrared transceiver, then the mobile computing device will inform the user there is no nearby infrared device at step 784. It will then proceed to step 756 where the mobile device will return to a mode where it continually listens for infrared packets as specified in the co-pending U.S. patent application entitled "Method and Apparatus for Serial Port Sharing" with Ser. No. 09/078,357 filed on May 13, 1998.

If there is a nearby infrared device, then that device will transmit a response such that the sending device will proceed to step 735. At step 735, the sending mobile computing device transmits the business card. In one embodiment, a business card is transmitted using the vCard format using IrDA infrared transmission standards.

At step 742, the sending mobile device waits for an acknowledgement from the receiving device. If not acknowledgement is received, then the mobile device informs the user that the business card send was not successful at step 777. If an acknowledgement is received, then the user is informed that the business card was sent at step 749. After a successful or successful transmission, the infrared component of the mobile device returns to a passive receive mode at step 756.

An Infrared Business Card Receiver

FIG. 8 discloses the control flow one possible embodiment of an electronic business card receiver. It should be noted that the business card sender and business card receiver should be implemented in the same mobile computing device such that users may both send and receive business card information. The embodiment of FIG. 8 is described with reference to a mobile computing device that has already executed the connection handshake by responding to an "Are you there?" message.

Referring to step 810, the mobile device begins receiving an infrared data packet. By examining the packet headers, the receiver identifies the data packet as a vCard MIME type. Thus, the receiver alerts the user of the packet being received and calls the incoming data callback routine in the addressbook application at step 820. In one embodiment, the addressbook program specifies that it wishes to display the default accept/reject dialogue box. The Exchange Manager then continues to receive the remainder of the data packet.

At step 830, after the entire vCard data packet has been received by the Exchange Manager, the Exchange Manager displays the accept/reject dialogue box. Specifically, the Exchange Manager displays a dialogue box which informs the user that a vCard has been received and that the Addressbook application will receive the data if the user accepts the data. The user enters a response at step 840.

If the user does not want the received vCard information, then the user rejects the vCard and the mobile computing system proceeds to step 890. At step 890, the vCard data is discarded and the pop-up dialogue box is removed from the display.

If the user wishes to keep the received business vCard, then the user accepts the vCard and the mobile computing device proceeds to step 850. At step 850, the Exchange Manager calls a callback routine in the Addressbook application for receiving vCard data. This callback routine was provided to the Exchange Manager when Addressbook registered with the Exchange Manager.

Within the callback routine, at step 860, the Addressbook callback routine opens a socket and receives the vCard data from the Exchange Manager. The Addressbook stores the newly received vCard in its file system. After storing the vCard, the Addressbook callback routine returns a call handle that can be called to activate the Addressbook program and bring the Addressbook into a state where the newly received vCard information is displayed.

At step 870, the Exchange manager then calls the returned call handle. The Addressbook application will activate and display the newly received vCard. Thus, with the teachings of the present invention, the user of the receiving mobile computing device merely accepts the incoming vCard packet and the mobile device automatically receives the vCard, stores the vCard, and displays the vCard.

The foregoing has described a unified method for providing external and interprocess communication in a computer system. It is contemplated that changes and modifications may be made by one of ordinary skill in the art, to the materials and arrangements of elements of the present invention without departing from the scope of the invention.

We claim:

1. A method of providing data communications in a computer system, said method comprising:

accepting message information within a unified exchange manager;

executing the unified exchange manager to select an appropriate application from a plurality of applications that are executable on the computer system, the unified exchange manager selecting the appropriate application based on a data type of the message information, wherein said unified exchange manager communicates with a plurality of communication libraries, each said communication library implementing a particular protocol for external communication, wherein at least one of said communication libraries comprises a wireless communication library;

determining whether a user accepts said message information; and passing said message information from said unified exchange manager to the appropriate application program in response to said user accepting said message information.

2. The method of claim 1, said method further comprising:

alerting said appropriate application that said appropriate application will be receiving said message information.

3. The method of claim 1, wherein said message information is from an external source.

4. The method of claim 1, wherein said message information is from a second application program.

5. The method of claim 1, said method further comprising:

returning from said appropriate application program a call handle that activates said application program and displays said message information.

6. The method as claimed in claim 1, wherein the at least one wireless communication library comprises an infrared communication library.

7. The method as claimed in claim 6, wherein said infrared communication library implements an IrDA protocol.

8. The method as claimed in claim 1, wherein one of said communication libraries comprises a pager communication library.

9. A computer system, said computer system comprising:

a plurality of application programs, each of the application programs accepting messages;

a first external communication device;

a first communication library for controlling said first external communication device, said first communication library accepting external messages through said first external communication device, wherein at least one of the communication libraries is for a wireless communication library; and a unified exchange manager, said unified exchange manager accepting messages from said first communication library, said unified exchange manager asking a user if said user wishes to accept a first message, the unified exchange messenger selecting one of the application programs in the plurality of application programs based on a data type of the first message, the unified exchange manager passing said message from said unified exchange manager to the selected program if said user accepts said message.

10. The computer system of claim 9 wherein said unified exchange manage alerts a first application that said first application will soon receive a message when said unified exchange manager receives a message of the data type for said first application.

11. The computer system of claim 9 further comprising:

a second communication library for interprocess communication, said second communication library accepting messages from applications on said computer system.

12. The computer system of claim 9, wherein one of said first communication library comprises an infrared communication library.

13. The computer system of claim 12, wherein said infrared communication library implements an IrDA protocol.

14. The computer system of claim 9, wherein one of said communication libraries comprises a pager communication library.

* * * * *